United States Patent
Fu et al.

(10) Patent No.: US 11,439,992 B2
(45) Date of Patent: Sep. 13, 2022

(54) PROCESS FOR PREPARING IRON(III)-EXCHANGED ZEOLITE COMPOSITION

(71) Applicant: BASF Corporation, Florham Park, NJ (US)

(72) Inventors: Qi Fu, Solon, OH (US); Barbara Slawski, North Royalton, OH (US); Peter Pfab, Shaker Heights, OH (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 16/899,138

(22) Filed: Jun. 11, 2020

(65) Prior Publication Data

US 2020/0298217 A1 Sep. 24, 2020

Related U.S. Application Data

(62) Division of application No. 16/062,364, filed as application No. PCT/IB2016/057837 on Dec. 20, 2016, now Pat. No. 10,710,059.

(60) Provisional application No. 62/270,737, filed on Dec. 22, 2015.

(51) Int. Cl.

| | |
|---|---|
| *B01J 29/72* | (2006.01) |
| *C01B 39/02* | (2006.01) |
| *B01J 29/76* | (2006.01) |
| *B01J 29/072* | (2006.01) |
| *B01D 53/94* | (2006.01) |
| *B01J 35/04* | (2006.01) |
| *B01J 37/02* | (2006.01) |
| *B01J 29/14* | (2006.01) |
| *B01J 37/30* | (2006.01) |
| *F01N 3/10* | (2006.01) |
| *F01N 3/20* | (2006.01) |

(52) U.S. Cl.
CPC ........ *B01J 29/723* (2013.01); *B01D 53/9418* (2013.01); *B01J 29/072* (2013.01); *B01J 29/14* (2013.01); *B01J 29/76* (2013.01); *B01J 29/763* (2013.01); *B01J 35/04* (2013.01); *B01J 37/0246* (2013.01); *B01J 37/30* (2013.01); *C01B 39/026* (2013.01); *F01N 3/106* (2013.01); *F01N 3/2066* (2013.01); *B01D 2255/20738* (2013.01); *B01D 2255/50* (2013.01); *B01J 2229/18* (2013.01); *B01J 2229/186* (2013.01); *F01N 2370/04* (2013.01)

(58) Field of Classification Search
CPC ..... C01B 39/026; F01N 3/106; F01N 3/2066; F01N 2370/04; B01D 53/9418; B01D 2255/20738; B01D 2255/50; B01D 2255/915; B01D 2255/9155; B01J 35/04; B01J 37/0246; B01J 37/30; B01J 29/072; B01J 29/14; B01J 29/76; B01J 29/763; B01J 29/723; B01J 29/7638; B01J 29/85; B01J 2229/18; B01J 2229/186
USPC ........................ 502/64, 74, 86; 422/177, 180
See application file for complete search history.

(56) References Cited

U.S. PATENT DOCUMENTS

| | | | |
|---|---|---|---|
| 6,689,709 B1 * | 2/2004 | Tran ..................... | B01J 29/7615 502/65 |
| 7,118,722 B2 * | 10/2006 | Tran ...................... | B01D 53/90 423/239.2 |
| 2007/0275977 A1 | 11/2007 | Van Aar et al. | |
| 2008/0044334 A1 | 2/2008 | Pieterse et al. | |
| 2009/0048095 A1 | 2/2009 | Li et al. | |
| 2012/0275977 A1 | 1/2012 | Chandler et al. | |
| 2015/0231620 A1 | 8/2015 | Montreuil | |
| 2015/0343425 A1 | 12/2015 | Ibe et al. | |
| 2016/0220988 A1 * | 8/2016 | Casci ................. | B01D 53/9418 |

FOREIGN PATENT DOCUMENTS

| | | |
|---|---|---|
| WO | WO 2008/116553 A1 | 10/2008 |
| WO | WO 2014/062949 A1 | 4/2014 |

OTHER PUBLICATIONS

Shishkin et al., "Synthesis and functionalization of SSZ-13 as an NH3-SCR catalyst", Catal. Sci. Technol., 2014, 4, pp. 3917-3926.*
Bid Art et al. "Iron-exchanged Zeolite as Effective Catalysts for Friedel-Crafts Alkylation with Alkyl Halides," *Catalysis Letters*, 2001, pp. 3-4, vol. 75.
Kulkarni et al. "Sorption of Water on Ferric Exchanged Y Zeolites," *Journal of Colloid and Interface Science*, 1989, pp. 341-346, vol. 130, No. 2.
LI et al., "Fe-USY Zeolite Catalyst for Effective Decomposition of Nitrous Oxide," *Environ. Sci. Technol.*, 2007, pp. 7901-7906, vol. 41.

(Continued)

Primary Examiner — Elizabeth D Wood
(74) Attorney, Agent, or Firm — Baltazar Gomez

(57) ABSTRACT

The present disclosure relates to processes for formation of a molecular sieve, particularly a metal-promoted molecular sieve, and more particularly an Iron(III) exchanged zeolite. Preferably, the zeolite is of the chabazite form or similar structure. The processes can include combining a zeolite with Iron(III) cations in an aqueous medium. The process can be carried out at a pH of less than about 7, and a buffering material can be used with the aqueous medium. The processes beneficially result in Iron exchange that can approach 100% along with removal of cations (such as sodium, $NH_4$, and H) from the zeolite. An Iron(III)-exchanged zeolite prepared according to the disclosed processes can include about 2,000 ppm or less of cation and about 1% by weight or greater of Iron(III). The disclosure also provides catalysts (e.g., SCR catalysts) and exhaust treatment systems including the Iron(III)-exchanged zeolite.

12 Claims, 2 Drawing Sheets

(56) References Cited

OTHER PUBLICATIONS

Pavlovic et al., "Modification of Natural Clinoptilolite for Nitrate Removal From Aqueous Media," *Journal of the Serbian Chemical Society*, 2014, pp. 1309-1322, vol. 79, No. 10.

Yang, et al., "Heterometal Incorporation in Metal Exchanged Zeolites Enables Low-Temperature Catalytic Activity of NOx Reduction," *The Journal of Physical Chemistry C*, 2012, vol. 116, No. 44, pp. 23322-23331.

Zhang et al., "Ammonia Selective Catalytic Reduction of NO Over Fe/Cu-SSZ-13," *RSC Advances*, 2014, vol. 4, No. 94, pp. 52130-52139.

\* cited by examiner

PROCESS FOR PREPARING IRON(III)-EXCHANGED ZEOLITE COMPOSITION

The present application is a divisional of U.S. application Ser. No. 16/062,364 filed Jun. 14, 2018, which is a U.S. National Phase application of PCT/IB2016/057837, filed Dec. 20, 2016, which claims priority to U.S. Provisional Patent Application No. 62/270,737, filed Dec. 22, 2015, the disclosures of which are incorporated herein by reference in their entirety.

FIELD OF THE DISCLOSURE

The present disclosure relates to process for preparing iron promoted zeolites that can be useful as catalysts, such as in an emission treatment system. More particularly, the processes provide improvements in Iron exchange with cations in zeolites having a chabazite structure or similar structure.

BACKGROUND

Selective catalytic reduction (SCR) of nitrogen oxides can be carried out using a zeolite promoter with a reductant such as ammonia, urea, and/or hydrocarbon in the presence of oxygen. While a variety of zeolite forms are known, certain forms, such as zeolite beta and chabazite have been particularly utilized for forming metal-promoted catalysts, particularly for SCR applications.

The catalysts employed in the SCR process ideally should be able to retain good catalytic activity over the wide range of temperature conditions of use, for example, about 200° C. to about 600° C. or higher, under hydrothermal conditions, which are often encountered such as during the regeneration of a soot filter, a component of the exhaust gas treatment system used for the removal of particles.

Metal-promoted zeolite catalysts useful in SCR have included, among others, iron-promoted zeolite catalysts and copper-promoted zeolite catalysts. For example, Iron-promoted zeolite beta has been described in U.S. Pat. No. 4,961,917. The process of preparation of metal containing Chabazite particularly can include exchange of the desired metal species with accompanying removal of alkali metals, such as sodium, which can be detrimental to the hydrothermal stability of the final catalyst. The typical $Na_2O$ level of Na-Chabazite is between 6,000 and 8,000 ppm. Sodium is known to degrade the zeolite structure under hydrothermal aging conditions via formation of $Na_4SiO_4$ and $Na_2Al_2O_4$ and concomitant dealumination of the zeolite.

Previous attempts to form Iron-exchanged zeolite using the chabazite form, have proven difficult. For example, U.S. Pat. Pub. No. 2015/0231620 proposes a method of preparing Iron-zeolite chabazite without ion exchange since the publication points out that it has been difficult to incorporate iron into chabazite zeolites such as SSZ-13 using traditional ion-exchange methods due to the small pore openings of the chabazite structure (e.g., in the 3-4 Angstrom range). The publication posits that its direct incorporation of iron during synthesis of the chabazite is preferred because incorporating iron into chabazite with ion exchange is not feasible due to the small pore size of chabazite. Nevertheless, because of the prevalence of utilization of ion-exchange in forming promoted zeolite catalysts, it would be useful to provide further methods for formation of Iron-exchanged zeolites, particularly Iron-exchanged chabazites and other zeolites with characteristics similar to chabazite forms.

SUMMARY OF THE DISCLOSURE

The present disclosure provides improved processes for forming Iron-exchanged zeolites, catalysts including such Iron-exchanged zeolites, emission systems utilizing such Iron-exchanged zeolites, and methods of NOx reduction using such Iron-exchanged zeolites. The presently described invention arises at least in part from the surprising finding that the ability to form Iron-exchanged zeolites, particularly small pore zeolites, can be significantly improved through specific use of Iron(III) salts instead of Iron(II) salts.

In some aspects, the present disclosure can relate to a process for preparing an Iron-exchanged zeolite. In one or more embodiments, such process can comprise combining a zeolite with Iron(III) cations in an aqueous medium such that the Iron(III) cations are exchanged into or onto the zeolite and an Iron(III)-exchanged zeolite is thus formed. Preferably, about 75% by weight or greater of the Iron(III) cations (or other amounts as further described herein) are exchanged into the zeolite. In one or more further embodiments, the process for preparing an Iron-exchanged zeolite can be further defined in relation to one or more of the following statements, which can singly relate to the process or can be combined in any number and/or order.

The zeolite can be a sodium-containing zeolite.

The zeolite can be an $NH_4$-containing zeolite.

The zeolite can be an H-containing zeolite.

The zeolite can have a double 6-ring (D6R) building unit structure.

The zeolite can have a chabazite (CHA) structure.

The Iron(III) cations can be provided directly from an Iron(III) salt.

The Iron(III) salt can be selected from the group consisting of Iron(III) halides, Iron(III) citrates, Iron(III) nitrates, Iron(III) sulfates, Iron(III) acetate, and combinations thereof.

The Iron(III) salt can be selected from the group consisting of Iron(III) nitrates, Iron(III) sulfates, and combinations thereof.

The Iron(III) cations can provided in situ via oxidation of an Iron(II) salt.

The Iron(II) salt can be oxidized in the aqueous medium by addition of an oxidizing agent to the aqueous medium.

The oxidizing agent can be one or more of air, substantially pure oxygen (e.g., having an O2 purity of about 95% or greater, about 98% or greater, or about 99% or greater), and peroxo compounds.

About 90% by weight or greater of the Iron(III) cations can be exchanged into the zeolite.

The Iron(III)-exchanged zeolite can comprise Iron(III) in an amount of about 1% by weight or greater.

The Iron(III)-exchanged zeolite can comprise Iron(III) in an amount of about 1% by weight to about 10% by weight.

The Iron(III)-exchanged zeolite can comprise sodium, $NH_4$, or H cations.

One or more cations can be present in the Iron(III)-exchanged zeolite in an amount of about 2,000 ppm or less.

The zeolite and the Iron(III) cations can be combined in an aqueous medium at a pH of less than 7.

The zeolite and the Iron(III) cations can be combined at a pH of about 2 to about 6.

The zeolite and the Iron(III) cations can be combined at a pH of about 3 to about 5.

The aqueous medium can further comprise a buffering agent.

The buffering agent can comprise ammonium acetate.

The exchange of Iron(III) into or onto the zeolite can be carried out at a temperature that is greater than about 10° C. and less than the decomposition temperature of the Iron(III) salt.

The exchange of Iron(III) into or onto the zeolite can be carried out at a temperature of about 10° C. to about 80° C.

The exchange of Iron(III) into or onto the zeolite can be carried out at a temperature of about 40° C. to about 70° C.

The process can result in substantially no ammonium nitrate formation.

The process can further comprise washing and filtering the Iron(III)-exchanged zeolite to a solution conductivity of about 200 micromhos or less.

In some aspects, the present disclosure can relate to an Iron(III)-exchanged molecular sieve. In some embodiments, the Iron(III)-exchanged molecular sieve can be prepared substantially according to the process otherwise described herein for preparation of an Iron-exchanged zeolite. In one or more embodiments, an Iron(III)-exchanged molecular sieve according to the present disclosure can comprise a porous zeolite having a double 6-ring (D6R) building unit structure, wherein cations in the zeolite have been exchanged with Iron(III) ions such that the zeolite includes about 1% by weight or greater of Iron(III). In one or more further embodiments, the Iron-exchanged molecular sieve can be further defined in relation to one or more of the following statements, which can singly relate to the composition or can be combined in any number and/or order The zeolite can include sodium, $NH_4$, or H cations.

The zeolite can include about 1% by weight to about 10% by weight of Iron(III).

The zeolite can have a chabazite (CHA) structure.

The zeolite can include sulfate in an amount of about 400 ppm or greater.

The Iron(III) can be substantially uniformly dispersed on the zeolite.

The Iron(III) can be adsorbed onto the zeolite.

In some aspects, the present disclosure can relate to a catalyst composition. In some embodiments, a catalyst according to the present disclosure can comprise an Iron-exchanged molecular sieve as otherwise described herein, the Iron(III)-exchanged molecular sieve being combined with a substrate. In one or more embodiments, a catalyst according to the present disclosure can comprise an Iron (III)-exchanged zeolite prepared by a process as otherwise described herein. As such, the catalyst can exhibit properties that would not otherwise be expected for a catalyst prepared according to a process wherein Iron(II) cations are exchanged.

In some aspects, the present disclosure can relate to an exhaust treatment system. In one or more embodiments, an exhaust treatment system can comprise a selective catalytic reduction (SCR) catalyst positioned to receive an exhaust gas stream, and the SCR catalyst can include an Iron(III)-exchanged zeolite having properties as otherwise described herein, which Iron(III)-exchanged zeolite particularly may be prepared by a process as otherwise described herein. In some embodiments, the exhaust treatment system can further comprise one or both of a diesel oxidation catalyst (DOC) and a catalyzed soot filter (CSF). In various embodiments, the exhaust treatment system can be characterized in that the exhaust gas stream contains one or both of ammonia and urea.

The invention includes, without limitation, the following embodiments:

Embodiment 1: A process for preparing an Iron-exchanged zeolite, the process comprising combining a zeolite with Iron(III) cations in an aqueous medium such that the Iron(III) cations are exchanged into or onto the zeolite to thus form an Iron(III)-exchanged zeolite.

Embodiment 2: The process of any previous or subsequent embodiment, wherein the zeolite has a double 6-ring (D6R) building unit structure.

Embodiment 3: The process of any previous or subsequent embodiment, wherein the zeolite has a chabazite (CHA) structure.

Embodiment 4: The process of any previous or subsequent embodiment, wherein the Iron(III) cations are provided from an Iron(III) salt.

Embodiment 5: The process of any previous or subsequent embodiment, wherein the Iron(III) salt is selected from the group consisting of Iron(III) halides, Iron(III) citrates, Iron(III) nitrates, Iron(III) sulfates, Iron(III) acetate, and combinations thereof.

Embodiment 6: The process of any previous or subsequent embodiment, wherein the Iron(III) salt is selected from the group consisting of Iron(III) nitrates, Iron(III) sulfates, and combinations thereof.

Embodiment 7: The process of any previous or subsequent embodiment, wherein the Iron(III) cations are provided in situ via oxidation of an Iron(II) salt.

Embodiment 8: The process of any previous or subsequent embodiment, wherein about 75% by weight or greater of the Iron(III) cations are exchanged into the zeolite.

Embodiment 9: The process of any previous or subsequent embodiment, wherein the Iron(III)-exchanged zeolite comprises Iron(III) in an amount of about 1% by weight or greater.

Embodiment 10: The process of any previous or subsequent embodiment, wherein the Iron(III)-exchanged zeolite comprises Iron(III) in an amount of about 1% by weight to about 10% by weight.

Embodiment 11: The process of any previous or subsequent embodiment, wherein the Iron(III)-exchanged zeolite comprises sodium, $NH_4$, or H cations in an amount of about 2,000 ppm or less.

Embodiment 12: The process of any previous or subsequent embodiment, wherein the zeolite and the Iron(III) cations are combined in an aqueous medium at a pH of less than 7.0.

Embodiment 13: The process of any previous or subsequent embodiment, wherein the pH is about 2.0 to about 6.0.

Embodiment 14: The process of any previous or subsequent embodiment, wherein the pH is about 3.0 to about 5.0.

Embodiment 15: The process of any previous or subsequent embodiment, wherein the aqueous medium further comprises a buffering agent.

Embodiment 16: The process of any previous or subsequent embodiment, wherein the buffering agent comprises ammonium acetate.

Embodiment 17: The process of any previous or subsequent embodiment, wherein the exchange of Iron(III) into or onto the zeolite is carried out at a temperature that is greater than about 30° C. and is less than the decomposition temperature of an Iron salt that is included in the aqueous medium as a source for the Iron(III) cations.

Embodiment 18: The process of any previous or subsequent embodiment, wherein the exchange of Iron(III) cations into or onto the zeolite is carried out at a temperature of about 30° C. to about 80° C.

Embodiment 19: The process of any previous or subsequent embodiment, wherein the exchange of Iron(III) cations into or onto the zeolite is carried out at a temperature of about 40° C. to about 70° C.

Embodiment 20: The process of any previous or subsequent embodiment, wherein the process results in substantially no ammonium nitrate formation.

Embodiment 21: The process of any previous or subsequent embodiment, wherein the process further comprises washing and filtering the Iron(III)-exchanged zeolite to a solution conductivity of about 200 micromhos or less.

Embodiment 22: An Iron(III)-exchanged molecular sieve comprising a porous zeolite having a double 6-ring (D6R) building unit structure, wherein cations in the zeolite have been exchanged with Iron(III) cations such that the zeolite includes about 1% by weight or greater of Iron(III).

Embodiment 23: The Iron(III)-exchanged molecular sieve of any previous or subsequent embodiment, wherein the zeolite is a sodium-containing zeolite, an $NH_4$-containing zeolite, or an H-containing zeolite.

Embodiment 24: The Iron(III)-exchanged molecular sieve of any previous or subsequent embodiment, wherein the zeolite includes about 1% by weight to about 10% by weight of Iron(III).

Embodiment 25: The Iron(III)-exchanged molecular sieve of any previous or subsequent embodiment, wherein the zeolite has a chabazite (CHA) structure.

Embodiment 26: The Iron(III)-exchanged molecular sieve of any previous or subsequent embodiment, wherein the zeolite includes sulfate in an amount of about 400 ppm or greater.

Embodiment 27: The Iron(III)-exchanged molecular sieve of any previous or subsequent embodiment, wherein the Iron(III) is substantially uniformly dispersed on the zeolite.

Embodiment 28: The Iron(III)-exchanged molecular sieve of any previous or subsequent embodiment, wherein the Iron(III) is adsorbed onto the zeolite.

Embodiment 29: A catalyst comprising an Iron(III)-exchanged molecular sieve according to any previous or subsequent embodiment combined with a substrate.

Embodiment 30: A catalyst comprising an Iron(III)-exchanged zeolite prepared by the process according to any previous or subsequent embodiment.

Embodiment 31: An exhaust treatment system comprising a selective catalytic reduction (SCR) catalyst positioned to receive an exhaust gas stream, the SCR catalyst including an Iron(III)-exchanged zeolite prepared by the process according to any previous or subsequent embodiment.

Embodiment 32: The exhaust treatment system of any previous or subsequent embodiment, further comprising one or both of a diesel oxidation catalyst (DOC) and a catalyzed soot filter (CSF).

Embodiment 33: The exhaust treatment system of any previous embodiment, wherein the exhaust gas stream contains one or both of ammonia and urea.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

DETAILED DESCRIPTION

Figure 1:
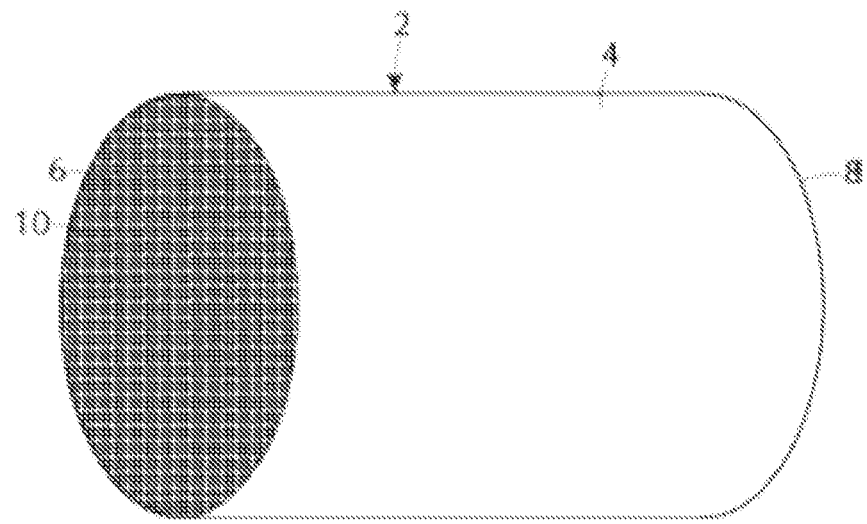
FIG. 1 is a perspective view of a honeycomb-type refractory carrier member which may comprise a catalyst component according to one or more embodiments of the present disclosure.

The present disclosure will now be described more fully hereinafter with reference to exemplary embodiments thereof These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides processes for the preparation of Iron-exchanged molecular sieves, particularly Iron-exchanged zeolites. Zeolites are understood to be aluminosilicate crystalline materials having substantially uniform pore sizes which, depending upon the type of zeolite and the type and amount of cations included in the zeolite lattice, can range from about 3 Angstroms to about 10 Angstroms in diameter. The presently disclosed processes are useful to overcome difficulties in previously forming Iron-exchanged zeolites that are suitable for use, for example, in an SCR catalyst.

In particular, the inventors have discovered that the ability to successfully form an Iron-exchanged zeolite using zeolites of the chabazite form and similar forms can be significantly improved by utilizing Iron(III) salts as the Iron source instead of Iron(II) salts. It was surprising to find that both Iron uptake and cation (e.g., sodium) removal can approach 100%.

The processes disclosed herein can be particularly useful for Iron exchange in a zeolite of the chabazite form. Chabazite has a framework structure consisting of a stacked sequence of 6-rings in the order AABBCC . . . , forming double 6-rings at each apex of the rhombic unit cell. Chabazite may thus be characterized as being of the type of zeolite having a double 6-ring (D6R) building unit. Such structure typically provides a cage that can be referred to as the chabazite cage. Thus, the International Zeolite Association has defined the chabazite structure as being a small pore zeolite with 8 member-ring pore openings (approximately 3.8 Angstroms) accessible through its 3-dimensional porosity. The cage-like structure results from the connection of the D6R building units by 4 rings. While zeolite of the CHA form can be particularly useful, other zeolite materials having similar characteristics, particularly having the D6R building unit and similarly sized small pore openings, can be used as the zeolite according to the present disclosure. In some embodiments, the zeolite can be have a structure type selected from AEI, AFT, AFX, CHA, EAB, ERI, KFI, LEV, SAS, SAT, and SAY. In one or more embodiments, the zeolite can be an aluminosilicate zeolite, a horosilicate, a gallosilicate, a SAPO, an ALPO, a MeAPSO. or a MeAPO. More particularly, the zeolite can be one or more of SSZ-13, SSZ-62, natural chabazite, zeolite K-G, Linde D, Linde R, LZ-218, LZ-235, LZ-236, ZK-14, SAPO-34, SAP 0-44, SAPO-47, and ZYT-6. In some embodiments, the zeolite can have a silica to alumina molar ratio in the rane of about 5 to about 100, about 5 to about 50, or about 10 to 50.

The zeolite can be in the H-form in one or more embodiments. In other embodiments, the zeolite can be in an exchanged form, including cation-exchanged forms.

The zeolite particularly is a sodium-containing zeolite that typically can have greater than 2,000 ppm sodium present in the framework thereof. In particular, a sodium-containing zeolite useful in Iron-exchange can have greater than 3,000 ppm, greater than 4,000 ppm, or greater than 5,000 ppm sodium ions present, for example about 2,500 ppm to about 8,000 ppm, about 3,000 ppm to about 7,000 ppm, or about 3,500 ppm to about 6,000 ppm sodium ions based on the total weight of the zeolite. In some embodiments, the zeolite can be exchanged with other cations, such as ammonium cations or hydrogen cations, in ranges such as noted above. It is understood that the use of "ppm" above and throughout the present application is intended to mean ppm by weight In some aspects, a process for preparing an Iron-exchanged zeolite according to the present disclosure can comprise combining a zeolite with Iron(III) cations in an aqueous medium so that Iron(III) cations are substantially uniformly exchanged into the zeolite. The aqueous medium particularly can include a buffering agent. Preferably, the Iron(III) cations uniformly exchange with a different cation, such as $H^+$, $NH_4^+$, $Na^+$, or the like. Use of Iron(III) cations beneficially can improve the process such that about 50% by weight or greater of the Iron(III) cations are exchanged into or onto the zeolite. In some embodiments, about 75% by weight or greater, about 80% by weight or greater, about 85% by weight or greater, about 90% by weight or greater, about 95% by weight or greater, or about 98% by weight or greater of the Iron(III) cations can be exchanged into or onto the zeolite. In particular, about 75% by weight to about 99.9% by weight, about 80% by weight to about 99.8% by weight, or about 90% by weight to about 99.5% by weight of the Iron(III) cations can be exchanged into or onto the zeolite. The Iron(III) cations can be provided directly or indirectly.

Any Iron(III) salt can be used in the present ion exchange process to directly provide the Iron(III) cations in the aqueous medium. In some embodiments, organic Iron(III) salts can be used—e.g., Iron(III) citrate, Iron(III) acetate, and Iron(III) oxalate. In some embodiments, inorganic Iron (III) salts can be used—e.g., Iron(III) halides, Iron(III) nitrates, and Iron(III) sulfates. If desired, combinations of two or more different Iron(III) salts can be used. In particular embodiments, the Iron(III) salt can be Iron(III) nitrate and/or Iron(III) sulfate. Various forms of the salts can be used, such as hydrates thereof Iron(III) complexes with organic ligands can be used, as well as Iron(III) combinations with organic or inorganic anions.

In some embodiments, Iron(III) cations can be provided indirectly by in situ formation using an Iron(II) salt. More particularly, the Iron(II) can be oxidized so as to generate the Iron(III) cations in situ. For example, air or substantially pure oxygen may be pumped through the solution. Other oxidizing agents may also be utilized for in situ Iron(III) formation including, but not limited to, peroxo compounds (e.g., $H_2O_2$, peroxodisulfate), or even strong oxidizers, such as permanganates and perchlorates, or the like.

The zeolite and the Iron(III) salt (or Iron(II) salt and oxidizer) are combined in an aqueous medium. In some embodiments, the aqueous medium can include one or more further components. For example, one or more buffering agents can be included. The buffering agent can be useful to maintain the ion exchange solution within a desired pH range. For example, it can be beneficial for the ion exchange solution (which is intended to include the aqueous medium) to be at a pH of less than 7. More particularly, pH can be in a range of about 2 to about 6, about 2.5 to about 5.5, or about 3 to about 5.

In some embodiments, ammonium acetate in particular may be included with the aqueous medium. Other materials that may be utilized, particularly to maintain a pH in a range as described above, include but are not limited to: ammonium sulfate; ammonium carbonate; ammonium bicarbonate; and ammonium formate. In some embodiments, it can be beneficial to alter the order of addition of components in carrying out the exchange. For example, the order of addition can be based upon the nature of the zeolite. In embodiments utilizing a sodium-containing zeolite, the buffer (e.g., ammonium acetate) can be added to the aqueous medium before addition of the Iron(III) cations. In embodiments utilizing zeolite in the H-form or $NH_4$-form, the buffer can be added to the aqueous medium after addition of the Iron(III) cations.

Ion exchange can be carried out at an elevated temperature. In some embodiments, the exchange of Iron(III) into the zeolite is carried out at a temperature that is greater than about 10° C. and is less than the decomposition temperature of the Iron(III) salt that is being used. More particularly, ion exchange can be carried out at a temperature of about 10° C. to about 150° C., about 20° C. to about 120° C., or about 30° C. to about 100° C. In certain embodiments, the temperature can be about 35° C. to about 90° C. or about 40° C. to about 70° C. Preferably, the Iron(III) salt and the zeolite are held in solution in the above-noted temperature range for a time of about 5 minutes or more, about 10 minutes or more, about 15 minutes or more, about 30 minutes or more, or about 45 minutes or more, such as about 5 minutes to about 240 minutes, about 10 minutes to about 180 minutes, about 15 minutes to about 180 minutes, about 20 minutes to about 120 minutes, or about 30 minutes to about 90 minutes. Similar temperatures and reaction times can be utilized in embodiments where an Iron(II) salt is oxidized to provide Iron(III) cations.

Following the ion exchange, the Iron-exchanged zeolite can be subject to one or more steps of filtering alone or in combination with washing. For example, the Iron-exchanged zeolite can be filtered from the aqueous medium to provide the finished product. In some embodiments, washing and filtering can be carried out utilizing a filter press. In such methods, the Iron-exchanged zeolite solution is pumped into a filter press unit wherein the Iron-exchanged zeolite solids collect on the filter webs. The increasing pressure on the filter webs as the solids are collected is beneficial to force non-solids through the web and into the filtrate. If desired, air may be forced through the filter cakes to further remove the non-solids. In one or more embodiments, filtering can be carried out with a funnel filter (e.g., a Buechner filter) and appropriate filter paper, and filtering may be augmented by application of a vacuum.

The filter cakes with the Iron-exchanged zeolite can be washed by pumping of an aqueous solvent through the filter cakes on the webs. The aqueous solvent, in some embodiments, can be demineralized water. In some embodiments, washing can be carried out until the filtrate has a desired conductivity. Any recognized method for measuring filtrate conductivity can be utilized according to the present disclosure such as, for example, the methods described in ASTM D1125-14, Standard Test Methods for Electrical Conductivity and Resistivity of Water. Standard conductivity measurement devices, such as a VWR® symphony™ Handheld Meter with a conductivity probe, can be used, preferably calibrating the device with a conductivity standard. Washing preferably can be carried out until the filtrate has a measured conductivity of about 400 micromhos or less, about 300 micromhos or less, about 250 micromhos or less, or about 200 micromhos or less, more particularly about 10 micromhos to about 400 micromhos, about 25 micromhos to about 300 micromhos, or about 50 micromhos to about 200 micromhos. In some embodiments, washing can be particularly used to remove a variety of ions from the solution, such as sodium, iron, ammonium, nitrates, acetate, and the like.

The Iron-exchanged zeolite prepared according to the present disclosure can exhibit particular properties. In some embodiments, the processes can provide an Iron-exchanged molecular sieve comprising a porous zeolite having a double 6-ring (D6R) building unit structure. The zeolite can be characterized in that cations in the zeolite have been exchanged with Iron(III) ions. The cation content will be within a range as otherwise described herein. The zeolite prepared according to the present disclosure can include Iron(III) in an amount of about 1% by weight or greater, about 1.25% by weight or greater, about 1.5% by weight or greater, or about 2% by weight or greater—e.g., about 1% by weight to about 10% by weight, about 1.1% by weight to about 7.5% by weight, or about 1.25% by weight to about 5% by weight. The Iron particularly can be substantially in the form of Iron(III) oxide—$Fe_2O_3$.

In one or more embodiments, the Iron-exchanged zeolite can be characterized in relation to the positional arrangement of the Iron(III) cations relative to the zeolite. In particular, the Iron(III) cations are preferably substantially uniformly dispersed onto the zeolite. For example, the Iron(III) cations can be adsorbed onto the zeolite with little or substantially none of the Iron(III) cations being present as extra-framework cations. Beneficially, however, the Iron (III) cations adsorbed onto the zeolite according to compositions of the present disclosure can move into extra-framework cationic positions during use of the material (e.g., as a catalyst) or during steaming of the material.

The Iron-exchanged zeolite can be in a substantially powdered form. In some embodiments, the Iron-exchanged zeolite can have a surface area of about 300 m²/g or greater, about 400 m²/g or greater, about 500 m²/g or greater, or about 600 m²/g or greater, such as about 300 m²/g to about 800 m²/g, about 400 m²/g to about 750 m²/g, or about 450 m²/g to about 700 m²/g. Surface area can be BET surface area, such as can be determined according to DIN 66131 or ASTM D3663-03 (2015), Standard Test Method for Surface Area of Catalysts and Catalyst Carriers, ASTM International, West Conshohocken, Pa., 2015.

In some embodiments, the zeolite can be characterized in relation to the presence of sulfur therein. For example, the Iron-exchanged zeolite can comprise sulfate in an amount of about 400 ppm or greater, about 500 ppm or greater, about 750 ppm or greater, or about 1,000 ppm or greater, such as about 400 ppm to about 5,000 ppm, about 500 ppm to about 4,500 ppm, or about 750 ppm to about 4,000 ppm, based upon the total weight of the Iron-exchanged zeolite.

The process of the present disclosure can be particularly beneficial in relation to the ability to avoid formation of certain by-products. For example, some processes for forming an Iron(II) exchanged zeolite can result in formation of ammonium nitrate, and removal of the by-product can be troublesome—e.g., requiring detonation to explosively decompose the material. In some embodiments, the presently disclosed processes, however, can be particularly beneficial in that the process results in substantially no ammonium nitrate formation.

The Iron-exchanged zeolite prepared according to the present disclosure can be utilized, for example, as a catalyst, particularly in the selective catalytic reduction of NOx. In some embodiments, the Iron-exchanged zeolite can be used as a molecular sieve, adsorbent, catalyst, catalyst support, or binder. The Iron-exchanged zeolite can be used in the form of self-supporting catalytic particles; however, in various embodiments, it can be dispersed, coated, or otherwise combined with a carrier substrate. In some embodiments, the Iron-exchanged zeolite can be formed into a slurry and applied, for example, as a washcoat to a substrate. If desired, a binder, such as titania, zirconia, or alumina may be used.

According to one or more embodiments, the substrate for the Iron-exchanged zeolite may be constructed of any material typically used for preparing automotive catalysts and will typically comprise a metal or ceramic honeycomb structure. The substrate typically provides a plurality of wall surfaces upon which the Iron-exchanged zeolite, for example as a washcoat, is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15% by weight of the alloy, e.g., about 10 to about 25% by weight of chromium, about 3 to about 8% by weight of aluminum, and up to 20% by weight of nickel. The alloys may also contain small or trace amounts of one or more other metals, such as manganese, copper, vanadium, titanium and the like. The surface or the metal carriers may be oxidized at high temperatures, e.g., 1,000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, cordierite-α alumina, silicon nitride, zircon mullite, spodumene, alumina-silica magnesia, zircon silicate, sillimanite, magnesium silicates, zircon, petalite, a alumina, aluminosilicates and the like. The substrates may be employed in various shapes such as corrugated sheet or monolithic form.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 200 to 400 cpsi. The wall thickness of flow-through substrates can vary, with a typical range being between 0.002 and 0.1 inches. A representative commercially-available flow-through substrate is the Corning 400/6 cordierite material, which is constructed from cordierite and has 400 cpsi and a wall thickness of 6 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi. The cross-sectional shape of the cells can vary as described above. Wall-flow substrates typically have a wall thickness between 0.002 and 0.1 inches. A representative commercially available wall-flow substrate is the Corning CO substrate, which is constructed from a porous cordierite. However, it will be understood that the invention is not limited to a particular substrate type, material, or geometry.

The Iron-exchanged zeolites and catalysts formed using the Iron-exchanged zeolites can be utilized in a wide variety of systems and methods. As non-limiting examples, the Iron-exchanged zeolites prepared according to the present disclosure can be used: as a catalyst in selective catalytic reduction (SCR) or nitrogen oxides, or NOx; as a catalyst for oxidation of $NH_3$, such as the oxidation of $NH_3$ slip in diesel systems; as a catalyst for the decomposition of $N_2O$; as a catalyst for soot oxidation; as a catalyst for emission control in Advanced Emission Systems, such as Homogeneous Charge Compression Ignition (HCCI) engines, as an additive in fluid catalytic cracking (FCC) processes; as a catalyst in organic conversion reactions; or as a catalyst in stationary source processes. If desired, one or more precious metals (e.g., Pd or Pt) can be added to the Iron-exchanged zeolite.

In some aspects, the present disclosure also relates to an emission (or exhaust) treatment system that incorporates the Iron-exchanged zeolite prepared as described herein. The zeolite particularly can be used in an integrated emissions treatment system comprising one or more additional components for the treatment of exhaust gas emissions, particularly diesel exhaust. For example, the emission treatment system may comprise a diesel oxidation catalyst (DOC) component, a catalyzed soot filter (CSF) component, and/or a selective catalytic reduction (SCR) catalytic article. The treatment system can include further components, such as ammonia oxidation materials, additional particulate filtration components, NOx storage and/or trapping components, and reductant injectors. The preceding list of components is merely illustrative and should not be taken as limiting the scope of the invention.

Figure 2:
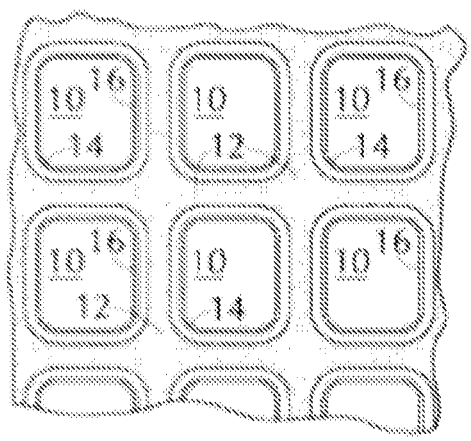
FIG. 2 is a partial cross-sectional view enlarged relative to FIG. 1, which shows an enlarged view of one of the gas flow passages shown in FIG. 1.

An exemplary catalyst according to the present disclosure is illustrated in FIG. 1, shows a refractory substrate member 2, in accordance with one or more embodiments. Referring to FIG. 1, the refractory substrate member 2 is a cylindrical shape having a cylindrical outer surface 4, an upstream end face 6 and a downstream end face 8, which is substantially identical to end face 6. Substrate member 2 has a plurality of fine, parallel gas flow passages 10 formed therein. As see in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As is more easily seen in FIG. 2, walls 12 are so dimensioned and configured that gas flow passages 10 have a substantially regular polygonal shape, substantially square in the illustrated embodiment, but with rounded corners as described in U.S. Pat. No. 4,335,023, which is incorporated herein by reference. A catalytic coating layer 14 is adhered to or coated onto the walls 12 of the substrate member. As shown in FIG. 2, an additional catalytic coating layer 16 is coated over the catalytic coating layer 14. In one or more embodiments, a third catalytic coating layer (not shown) can be applied to the substrate beneath. As will be appreciated by one of skill in the art, a catalyst according to the present disclosure can thus include one catalytic coating layer or a plurality of catalytic coating layers. The iron(III)-exchanged zeolite of the present disclosure may be present in catalytic coating layer 14 and/or in the additional catalytic coating layer 16.

Figure 3:
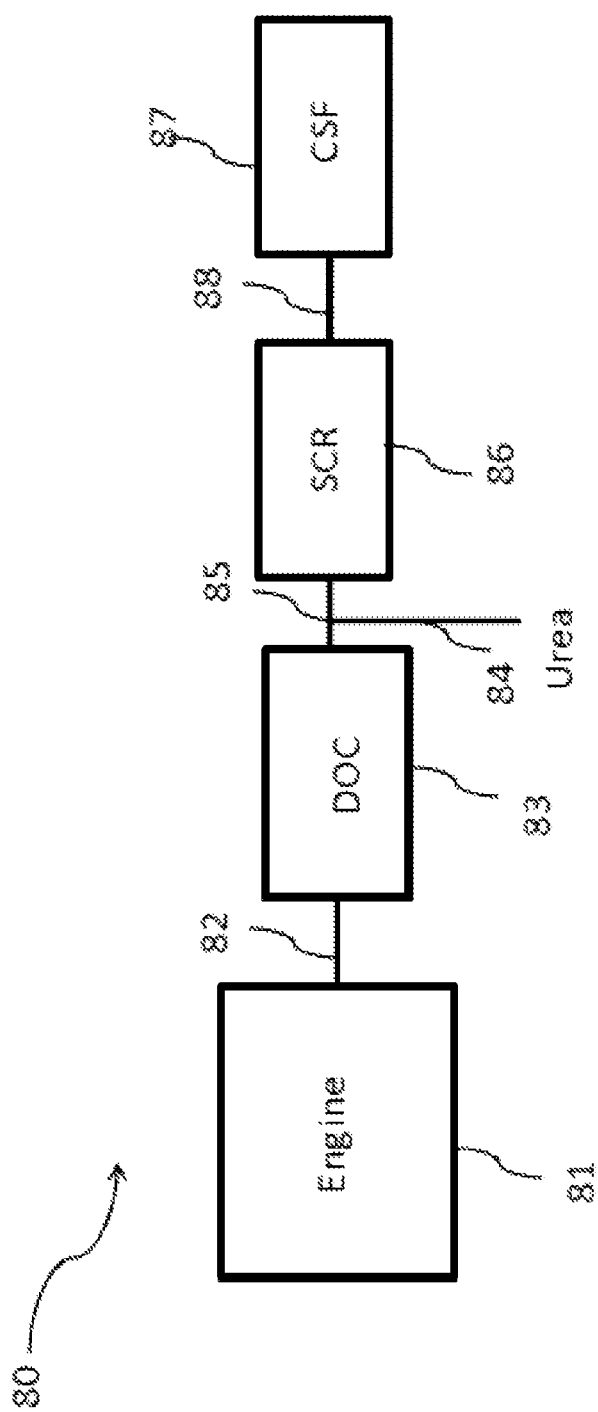
FIG. 3 is a schematic of an exhaust treatment system according to one or more embodiments of the present disclosure.

Exemplary emission treatment systems may be more readily appreciated by reference to FIG. 3, which depict a schematic representation of an emission treatment system, in accordance with one or more embodiments of the present invention. FIG. 3 shows an exemplary embodiment of an emission treatment system 80 comprising an engine 81, a diesel oxidation catalyst (DOC) 83, a selective catalytic reduction (SCR) component 86, and a catalyzed soot filter (CSF) 87. An exhaust conduit 82 is in fluid communication with the engine 81 via an exhaust manifold and the DOC 83. Exhaust from the DOC 83 is next conveyed via exhaust conduit line 85 to the downstream SCR component 86. An ammonia precursor (e.g. aqueous urea) is injected via line 84 into the exhaust line 85. The exhaust gas stream with added ammonia is conveyed via line 85 to the SCR component 86 for the treatment and/or conversion of NOR. The CSF 87 is downstream of the SCR catalyst 86, and the exhaust gas stream may be conveyed to the CSF 87 via exhaust conduit 88. It is understood that one or both of the DOC 83 and the CSF 87 can be optional and thus may be absent from the emission treatment system. As such, the emission treatment system may include the engine 81, the SCR catalyst 86, and a connecting exhaust line. The ammonia injection line 84 can also be present in such embodiments. In particular, an SCR system including the present Iron-exchanged zeolite that is integrated in the exhaust gas treatment system of a vehicle can include the following components: an SCR catalyst comprising an Iron-exchanged zeolite as described herein; a urea storage tank; a urea pump; a urea dosing system; a urea injector/nozzle; and a respective control unit. Such elements, and further elements useful in an emission treatment system according to the present disclosure, are described in U.S. Pat. No. 9,040,006, which is incorporated herein by reference.

In some aspects, the present disclosure also can relate to a method for selectively reducing nitrogen oxides (NOx) from a stream, such as an exhaust gas. In particular, the stream can be contacted with a catalyst including an Iron-exchanged zeolite prepared according to the present disclosure. The term nitrogen oxides, or NOx, as used herein encompasses any and all oxides of nitrogen, including but not limited to $N_2O$, NO, $N_2O_3$, $NO_2$, $N_2O_4$, $N_2O_5$, and $NO_3$. The Iron-exchanged zeolites of the present disclosure particularly can be used as a catalytically active material in a method for removing nitrogen oxides from exhaust gases of internal combustion engines, in particular diesel engines, which operate at combustion conditions with air in excess of that required for stoichiometric combustion, i.e., at lean conditions.

In some embodiments, an Iron-exchanged zeolite used as an SCR catalyst can be effective so as to provide a NOx conversion of at least 60%, at least 65%, at least 70%, at least 75%, at least 80%, or at least 85% over a temperature range of about 300° C. to about 600° C., about 325° C. to about 600° C., about 350° C. to about 600° C., about 350° C. to about 550° C., about 350 to about 500° C., or about 350 to about 450° C.

EXPERIMENTAL

Aspects of the present disclosure are more fully illustrated by the following examples, which are set forth to illustrate certain aspects of the present disclosure and are not to be construed as limiting thereof. Relative concentrations (percent by weight and ppm) are understood to relate to the total weight of the Iron exchanged zeolite.

EXAMPLE 1

Comparative

The starting material for the testing was Na-SSZ13 (1) [00114]. Initially, SSZ-13 was crystallized as described in U.S. Pat. No. 4,544,538, which is incorporated herein by reference, using trimethyladamantyl ammonium hydroxide as the template and sodium hydroxide as a further source of OH. The pH was adjusted to 7.5, and the material was recovered by filtration and dried before calcining at 600° C. to produce the Na-form of SSZ-13. Chemical analysis showed the material to have 28% by weight SiO2:Al2O3, and 0.94% by weight of $Na_2O$ on a volatile-free basis. XRD indicated that pure SSZ-13 had been obtained. The BET surface of the calcined material, determined according to DIN 66131, was 670 m$^2$/g. The resulting powdered, sodium-containing zeolite (60 g) was added to 420 g deionized water. The mixture was heated to approximately 60° C. Ammonium Iron(II) sulfate (6.94 g) was added followed by ammonium sulfate (1.98 g). Solution pH was 1.84. The mixture was held at temperature for approximately 60 minutes. The mixture was then washed and filtered in a Buechner filter, and the filtrate was dried. The resulting Iron(II) exchanged zeolite had an Iron concentration of 0.046% (460 ppm) by weight (calculated as $Fe_2O_3$) and a sodium concentration of 0.0207% (207 ppm) by weight.

EXAMPLE 2

Comparative

The starting material for the testing was Na-SSZ13 (1) [00114]. Initially, SSZ-13 was crystallized as described in U.S. Pat. No. 4,544,538, which is incorporated herein by reference, using trimethyladamantyl ammonium hydroxide as the template and sodium hydroxide as a further source of OH. The pH was adjusted to 7.5, and the material was recovered by filtration and dried before calcining at 600° C. to produce the Na-form of SSZ-13. Chemical analysis showed the material to have 28% by weight SiO2:Al2O3, and 0.94% by weight of $Na_2O$ on a volatile-free basis. XRD indicated that pure SSZ-13 had been obtained. The BET surface of the calcined material, determined according to DIN 66131, was 670 m$^2$/g. The resulting powdered, sodium-containing zeolite (60 g) was added to 420 g deionized water. The mixture was heated to approximately 60° C. Ammonium Iron(II) sulfate (6.94 g) was added followed by ammonium sulfate (28.0 g). Solution pH was 2.40. The mixture was held at temperature for approximately 60 minutes. The mixture was then washed and filtered in a Buechner filter, and the filtrate was dried. The resulting Iron(II) exchanged zeolite had an Iron concentration of 0.668% (6,680 ppm) by weight (calculated as $Fe_2O_3$) and a sodium concentration of 0.255% (2,550 ppm) by weight.

EXAMPLE 3

Comparative

The starting material for the testing was Na-SSZ13 (1) [00114]. Initially, SSZ-13 was crystallized as described in U.S. Pat. No. 4,544,538, which is incorporated herein by reference, using trimethyladamantyl ammonium hydroxide as the template and sodium hydroxide as a further source of OH. The pH was adjusted to 7.5, and the material was recovered by filtration and dried before calcining at 600° C. to produce the Na-form of SSZ-13. Chemical analysis showed the material to have 28% by weight SiO2:Al2O3, and 0.94% by weight of $Na_2O$ on a volatile-free basis. XRD indicated that pure SSZ-13 had been obtained. The BET surface of the calcined material, determined according to DIN 66131, was 670 m$^2$/g. The resulting powdered, sodium-containing zeolite (60 g) was added to 420 g deionized water. The mixture was heated to approximately 60° C. Iron(II) sulfate hexahydrate (4.92 g) was added followed by ammonium sulfate (4.36 g). Solution pH was 1.87. The mixture was held at temperature for approximately 60 minutes. The mixture was then washed and filtered in a Buechner filter, and the filtrate was dried. The resulting Iron(II) exchanged zeolite had an Iron concentration of 0.054% (540 ppm) by weight (calculated as $Fe_2O_3$) and a sodium concentration of 0.019% (190 ppm) by weight.

EXAMPLE 4

Comparative

The starting material for the testing was Na-SSZ13 (1) [00114]. Initially, SSZ-13 was crystallized as described in U.S. Pat. No. 4,544,538, which is incorporated herein by reference, using trimethyladamantyl ammonium hydroxide as the template and sodium hydroxide as a further source of OH. The pH was adjusted to 7.5, and the material was recovered by filtration and dried before calcining at 600° C. to produce the Na-form of SSZ-13. Chemical analysis showed the material to have 28% by weight SiO2:Al2O3, and 0.94% by weight of $Na_2O$ on a volatile-free basis. XRD indicated that pure SSZ-13 had been obtained. The BET surface of the calcined material, determined according to DIN 66131, was 670 m$^2$/g. The resulting powdered, sodium-containing zeolite (60 g) was added to 420 g deionized water. The mixture was heated to approximately 60° C. Iron(II) sulfate hexahydrate (4.92 g) was added. Solution pH was 3.83. The mixture was held at temperature for approximately 60 minutes. The mixture was then washed and filtered in a Buechner filter, and the filtrate was dried. The resulting Iron(II) exchanged zeolite had an Iron concentration of 0.038% (380 ppm) by weight (calculated as $Fe_2O_3$) and a sodium concentration of 0.0055% (55 ppm) by weight.

EXAMPLE 5

Comparative

Powdered, sodium-containing zeolite (60 g) was added to 420 g deionized water. The zeolite was SSZ-13 CHA-type aluminosilicate with pore sizes of approximately 0.38 nm×0.38 nm. The mixture was heated to approximately 60° C. Iron(II) sulfate hexahydrate (5.00 g) was added. Solution pH was 4.10. The mixture was held at temperature for approximately 60 minutes. The mixture was then washed and filtered in a Buechner filter, and the filtrate was dried. The resulting Iron(II) exchanged zeolite had an Iron concentration of 0.6835% (6,835 ppm) by weight (calculated as $Fe_2O_3$) and a sodium concentration of 0.299% (2,990 ppm) by weight.

EXAMPLE 6

Comparative

Powdered, sodium-containing zeolite (60 g) was added to 420 g deionized water. The zeolite was SSZ-13 CHA-type aluminosilicate with pore sizes of approximately 0.38 nm×0.38 nm. The mixture was heated to approximately 60° C. Iron(III) ammonium citrate (4.75 g) was added. Solution pH was 2.44. The mixture was held at temperature for approximately 60 minutes. The mixture was then washed and filtered in a Buechner filter, and the filtrate was dried. The resulting Iron(III) exchanged zeolite had an Iron concentration of 0.0307% (307 ppm) by weight (calculated as $Fe_2O_3$) and a sodium concentration of 0.148% (1,480 ppm) by weight. Although not wishing to be bound by theory, it is believed that Iron(III) ammonium citrate did not exchange significantly because of the pH of the solution.

EXAMPLE 7

Comparative

Powdered, sodium-containing zeolite (60 g) was added to 420 g deionized water. The zeolite was SSZ-13 CHA-type aluminosilicate with pore sizes of approximately 0.38 nm×0.38 nm. The mixture was heated to approximately 60° C. Iron(II) sulfate hexahydrate (5.00 g) was added followed by ammonium acetate (6.12 g). Solution pH was 4.80. The mixture was held at temperature for approximately 60 minutes. The mixture was then washed and filtered in a Buechner filter, and the filtrate was dried. The resulting Iron(III) exchanged zeolite had an Iron concentration of 0.2615% (2,615 ppm) by weight (calculated as $Fe_2O_3$) and a sodium concentration of 0.0115% (115 ppm) by weight.

EXAMPLE 8

Inventive

Powdered, sodium-containing zeolite (60 g) was added to 420 g deionized water. The zeolite was SSZ-13 CHA-type aluminosilicate with pore sizes of approximately 0.38 nm×0.38 nm. The mixture was heated to approximately 60° C. Iron(III) nitrate (7.14 g) was added followed by ammonium acetate (6.12 g). Solution pH was 3.37. The mixture was held at temperature for approximately 60 minutes. The mixture was then washed and filtered in a Buechner filter, and the filtrate was dried. The resulting Iron(III) exchanged zeolite had an Iron concentration of 1.678% (16,780 ppm) by weight (calculated as $Fe_2O_3$) and a sodium concentration of 0.0080% (80 ppm) by weight.

EXAMPLE 9

Inventive

Powdered, sodium-containing zeolite (60 g) was added to 390 g deionized water. The zeolite was SSZ-13 CHA-type aluminosilicate with pore sizes of approximately 0.38 nm×0.38 nm. The mixture was heated to approximately 60° C. Iron(III) sulfate (3.26 g) was added. Solution pH was 1.95. The mixture was held at temperature for approximately 60 minutes. The mixture was then washed and filtered in a Buechner filter, and the filtrate was dried. The resulting Iron(III) exchanged zeolite had an Iron concentration of 0.701% (7,010 ppm) by weight (calculated as $Fe_2O_3$) and a sodium concentration of 0.21% (2,100 ppm) by weight.

EXAMPLE 10

Inventive

Powdered, sodium-containing zeolite (60 g) was added to 390 g deionized water. The zeolite was SSZ-13 CHA-type aluminosilicate with pore sizes of approximately 0.38 nm×0.38 nm. The mixture was heated to approximately 60° C. Iron(III) sulfate (3.26 g) was added followed by ammonium acetate (8.0 g). Solution pH was 4.95. The mixture was held at temperature for approximately 60 minutes. The mixture was then washed and filtered in a Buechner filter, and the filtrate was dried. The resulting Iron(III) exchanged zeolite had an Iron concentration of 1.27% (12,700 ppm) by weight (calculated as $Fe_2O_3$) and a sodium concentration of 0.0090% (90 ppm) by weight.

EXAMPLE 11

Inventive

Powdered, sodium-containing zeolite (60 g) was added to 390 g deionized water. The zeolite was SSZ-13 CHA-type aluminosilicate with pore sizes of approximately 0.38 nm×0.38 nm. The mixture was heated to approximately 60° C. Iron(III) sulfate (3.91 g) was added followed by ammonium acetate (8.0 g). Solution pH was 4.80. The mixture was held at temperature for approximately 60 minutes. The mixture was then washed and filtered in a Buechner filter, and the filtrate was dried. The resulting Iron(III) exchanged zeolite had an Iron concentration of 1.57% (15,700 ppm) by weight (calculated as $Fe_2O_3$) and a sodium concentration of 0.0112% (112 ppm) by weight.

EXAMPLE 12

Inventive

Powdered, sodium-containing zeolite (12,000 g) was added to 78,000 g deionized water. The zeolite was SSZ-13 CHA-type aluminosilicate with pore sizes of approximately 0.38 nm×0.38 nm. Ammonium acetate (1,600 g) was added with 101 g deionized water as rinse water. The mixture was heated to approximately 60° C. Iron(III) sulfate (874.6 g) was added with 70 g deionized water as rinse water.

Solution pH was 4.37. The mixture was held at temperature for approximately 60 minutes. The mixture was then washed and filtered in a Buechner filter, and the filtrate was dried. Dry weight of recovered Iron(III) exchanged zeolite was 11,100 g. The resulting Iron(III) exchanged zeolite had an Iron concentration of 1.6363% (16,363 ppm) by weight (calculated as $Fe_2O_3$) and a sodium concentration of 0.0568% (568 ppm) by weight.

TABLE 1

| Example | Zeolite Type (amount) | Iron Source (amount) | Additive(s) (amount) | Slurry pH | Product Fe Content % (ppm) | Product Na Content % (ppm) |
|---|---|---|---|---|---|---|
| 1 | Na-SSZ-13 (60 g) | $(NH_4)_2Fe(SO_4)_2 \cdot 6H_2O$ (6.94 g) | $(NH_4)_2(SO_4)_2$ (1.98 g) | 1.84 | 0.046% (460 ppm) | 0.0207% (207 ppm) |
| 2 | Na-SSZ-13 (60 g) | $(NH_4)_2Fe(SO_4)_2 \cdot 6H_2O$ (6.94 g) | $(NH_4)_2(SO_4)_2$ (28.0 g) | 2.40 | 0.668% (6680 ppm) | 0.255% (2550 ppm) |
| 3 | Na-SSZ-13 (60 g) | $FeSO_4$ (4.92 g) | $(NH_4)_2(SO_4)_2$ (4.36 g) | 1.87 | 0.054% (540 ppm) | 0.019% (190 ppm) |
| 4 | Na-SSZ-13 (60 g) | $FeSO_4$ (4.92 g) | NA | 3.83 | 0.038% (380 ppm) | 0.0055% (55 ppm) |
| 5 | Na-SSZ-13 (60 g) | $FeSO_4$ (5.00 g) | NA | 4.10 | 0.6835% (6835 ppm) | 0.299% (2990 ppm) |
| 6 | Na-SSZ-13 (60 g) | Iron Ammonium Citrate (4.75 g) | NA | 2.44 | 0.0307% (307 ppm) | 0.148% (1480 ppm) |
| 7 | Na-SSZ-13 (60 g) | $FeSO_4$ (5.00 g) | $C_2H_3O_2NH_4$ (6.12 g) | 4.80 | 0.2615% (2615 ppm) | 0.0115% (115 ppm) |
| 8 | Na-SSZ-13 (60 g) | $Fe(NO_3)_3$ (7.14 g) | $C_2H_3O_2NH_4$ (6.12 g) | 3.37 | 1.678% (16780 ppm) | 0.0080% (80 ppm) |
| 9 | Na-SSZ-13 (60 g) | $Fe_2(SO_4)_3$ (3.26 g) | NA | 1.95 | 0.701% (7010 ppm) | 0.21% (2100 ppm) |
| 10 | Na-SSZ-13 (60 g) | $Fe_2(SO_4)_3$ (3.26 g) | $C_2H_3O_2NH_4$ (8.0 g) | 4.95 | 1.27% (12700 ppm) | 0.009% (90 ppm) |
| 11 | Na-SSZ-13 (60 g) | $Fe_2(SO_4)_3$ (3.91 g) | $C_2H_3O_2NH_4$ (8.0 g) | 4.8 | 1.57% (15700 ppm) | 0.0112% (112 ppm) |
| 12 | SSZ-13 (12,000 g) | $Fe_2(SO_4)_3$ (874.6 g) | $C_2H_3O_2NH_4$ (1600 g) | 4.37 | 1.6363% (16363 ppm) | 0.0568% (568 ppm) |

As can be seen above, inventive Examples 8 and 10-12 resulted in Iron(III) exchange such that the resulting zeolite included greater than 1% by weight Iron(III) and less than 600 ppm sodium. The average Iron(III) concentration in the inventive ion-exchanged zeolites was 1.37% by weight. On the contrary, the comparative examples using Iron(II) salts resulted in zeolites including 0.29% Iron(II) on average (with two comparative examples achieving 0.668% and 0.6835% Iron(II) by weight but the remaining comparative examples achieving less than 0.06% Iron(II). It was surprising to find that the use of Iron(III) cations instead of Iron(II) cations could provide such a significant increase in the amount of Iron exchange in the zeolites tested, the average iron concentration in the Iron(III) tests being approximately four times greater than the average iron concentration in the Iron(II) tests.

EXAMPLE 13

Inventive

Further Iron(III) exchanged zeolites were prepared in the manner as described above. The materials used and the nature of the resultant exchanged zeolites are shown in TABLE 2.

TABLE 2

| Example | Zeolite Type (amount) | Iron Source (amount) | Additive(s) (amount) | Slurry pH | Product Fe Content % (ppm) | Product Na Content % (ppm) |
|---|---|---|---|---|---|---|
| 13a | H-SSZ-13 (50 g) | $Fe(NO_3)_3$ (5.9 g) | $C_2H_3O_2NH_4$ (10 g) | 4.56 | 1.60% (1600 ppm) | 0.0080% (80 ppm) |
| 13b | H-SSZ-13 (50 g) | $Fe(NO_3)_3$ (5.9 g) | $C_2H_3O_2NH_4$ (8.5 g) | 4.16 | 1.24% (1240 ppm) | 0.0120% (120 ppm) |
| 13c | H-SSZ-13 (50 g) | $Fe(NO_3)_3$ (5.9 g) | $C_2H_3O_2NH_4$ (7.0 g) | 4.09 | 1.32% (1320 ppm) | 0.0080% (80 ppm) |
| 13d | H-SSZ-13 (50 g) | $Fe(NO_3)_3$ (5.9 g) | $C_2H_3O_2NH_4$ (6.0 g) | 3.53 | 0.66% (660 ppm) | 0.0090% (90 ppm) |
| 13e | H-SSZ-13 (50 g) | $Fe(NO_3)_3$ (5.9 g) | $C_2H_3O_2NH_4$ (5.2 g) | 2.81 | 0.42% (420 ppm) | 0.0090% (90 ppm) |
| 13f | $NH_4$-SSZ-13 (50 g) | $Fe(NO_3)_3$ (39.1 g) | $C_2H_3O_2NH_4$ (28.6 g) | 3.89 | 2.73% (2730 ppm) | <0.01% (<100 ppm) |
| 13g | Na-SSZ-13 (50 g) | $Fe(NO_3)_3$ (5.9 g) | $C_2H_3O_2NH_4$ (7.5 g) | 4.52 | 1.41% (1410 ppm) | 0% (0 ppm) |
| 13h | Na-SSZ-13 (50 g) | $Fe(NO_3)_3$ (5.9 g) | $C_2H_3O_2NH_4$ (7.0 g) | 4.34 | 1.53% (1530 ppm) | 0.0280% (280 ppm) |
| 13i | Na-SSZ-13 (50 g) | $Fe(NO_3)_3$ (5.9 g) | $C_2H_3O_2NH_4$ (6.5 g) | 4.16 | 1.56% (1560 ppm) | 0.0260% (260 ppm) |
| 13j | Na-SSZ-13 (50 g) | $Fe(NO_3)_3$ (5.9 g) | $C_2H_3O_2NH_4$ (6.3 g) | 4.09 | 1.51% (1510 ppm) | 0.0130% (130 ppm) |
| 13k | Na-SSZ-13 (50 g) | $Fe(NO_3)_3$ (5.9 g) | $C_2H_3O_2NH_4$ (5.9 g) | 3.53 | 1.50% (1500 ppm) | 0.0190% (190 ppm) |
| 13l | Na-SSZ-13 (50 g) | $Fe(NO_3)_3$ (5.9 g) | $C_2H_3O_2NH_4$ (4.5 g) | 2.95 | 1.41% (1410 ppm) | 0.0130% (130 ppm) |
| 13m | Na-SSZ-13 (50 g) | $Fe(NO_3)_3$ (8.5 g) | $C_2H_3O_2NH_4$ (8.85 g) | 4.33 | 2.24% (2240 ppm) | — |

TABLE 2-continued

| Example | Zeolite Type (amount) | Iron Source (amount) | Additive(s) (amount) | Slurry pH | Product Fe Content % (ppm) | Product Na Content % (ppm) |
|---|---|---|---|---|---|---|
| 13n | Na-SSZ-13 (50 g) | Fe(NO$_3$)$_3$ (9.5 g) | C$_2$H$_3$O$_2$NH$_4$ (10.0 g) | 4.31 | 2.46% (2460 ppm) | — |
| 13o | Na-SSZ-13 (50 g) | Fe(NO$_3$)$_3$ (11 g) | C$_2$H$_3$O$_2$NH$_4$ (12.0 g) | 4.49 | 3.12% (3120 ppm) | — |
| 13p | Na-SSZ-13 (50 g) | Fe(NO$_3$)$_3$ (13 g) | C$_2$H$_3$O$_2$NH$_4$ (15.0 g) | 4.32 | 3.84% (3840 ppm) | — |
| 13q | Na-SSZ-13 (50 g) | Fe(NO$_3$)$_3$ (22 g) | C$_2$H$_3$O$_2$NH$_4$ (24.5 g) | 4.55 | 5.85% (5850 ppm) | — |
| 13r | Na-SSZ-13 (50 g) | Fe(NO$_3$)$_3$ (27 g) | C$_2$H$_3$O$_2$NH$_4$ (36.5 g) | 4.31 | 5.80% (5800 ppm) | — |

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An Iron(III)-exchanged molecular sieve comprising a porous zeolite having a double 6-ring (D6R) building unit structure, wherein cations in the zeolite have been exchanged with Iron(III) cations such that the zeolite includes about 1% by weight of the zeolite or greater of Iron(III), wherein the Iron(III)-exchanged molecular sieve is prepared by combining a zeolite with Iron(III) cations in an aqueous media such that the Iron(III) cations are exchanged into or onto the zeolite to form the Iron(III)-exchanged zeolite, and wherein the aqueous medium comprises a buffering agent and is at a pH of about 2.0 to about 6.0.

2. The Iron(III)-exchanged molecular sieve of claim 1, wherein the zeolite is a sodium-containing zeolite, an NH$_4$-containing zeolite, or an H-containing zeolite.

3. The Iron(III)-exchanged molecular sieve of claim 1, wherein the zeolite includes about 1% to about 10% by weight of the zeolite of Iron(III).

4. The Iron(III)-exchanged molecular sieve of claim 1, wherein the zeolite has a chabazite (CHA) structure.

5. The Iron(III)-exchanged molecular sieve of claim 1, wherein the zeolite includes sulfate in an amount of about 400 ppm or greater based on the total weight of the Iron (III)-exchanged zeolite.

6. The Iron(III)-exchanged molecular sieve of claim 1, wherein the Iron(III) is dispersed on the zeolite.

7. The Iron(III)-exchanged molecular sieve of claim 1, wherein the Iron(III) cations are exchanged onto the zeolite.

8. A catalyst comprising an Iron(III)-exchanged molecular sieve according to claim 1 combined with a substrate.

9. A catalyst comprising an Iron(III)-exchanged zeolite according to claim 1.

10. An exhaust treatment system comprising a selective catalytic reduction (SCR)catalyst positioned to receive an exhaust gas stream, the SCR catalyst including an Iron(III)-exchanged zeolite according to claim 1.

11. The exhaust treatment system of claim 10, further comprising one or both of a diesel oxidation catalyst (DOC) and a catalyzed soot filter (CSF).

12. The exhaust treatment system of claim 10, further comprising a reductant injector.

* * * * *